Feb. 16, 1926. 1,573,521
W. C. MORAN
TESTING MACHINE
Filed August 8, 1925 2 Sheets-Sheet 1
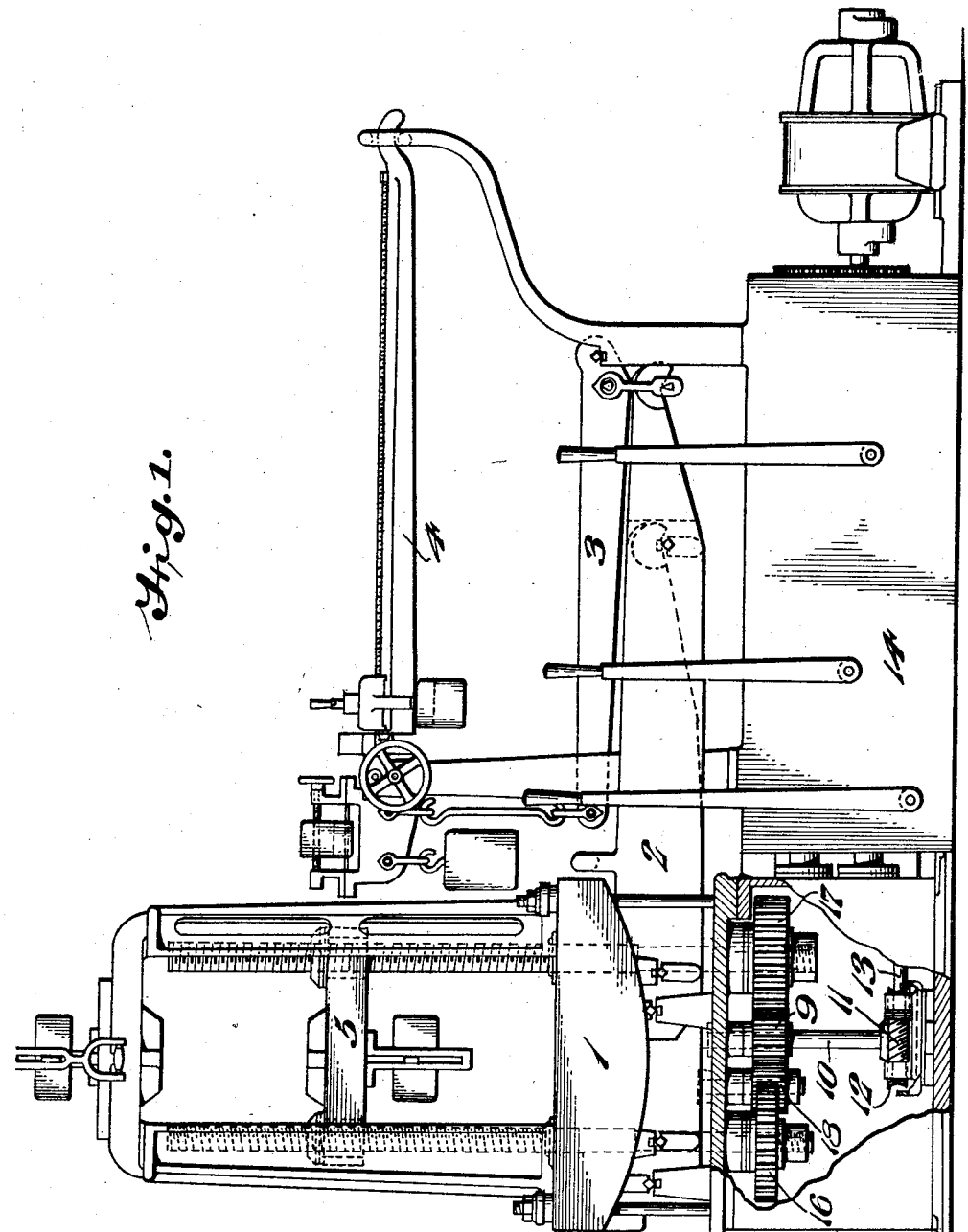
INVENTOR.
William C. Moran,
BY
ATTORNEYS.

Feb. 16, 1926. 1,573,521
W. C. MORAN
TESTING MACHINE
Filed August 8, 1925   2 Sheets-Sheet 2
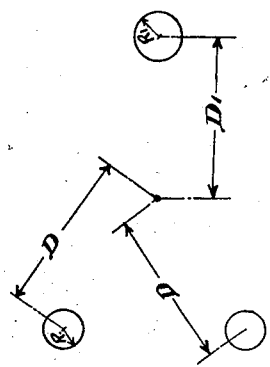
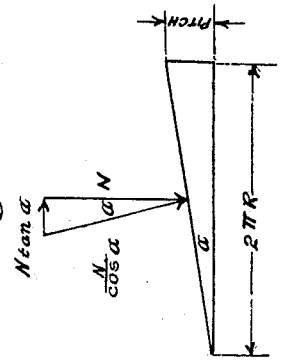
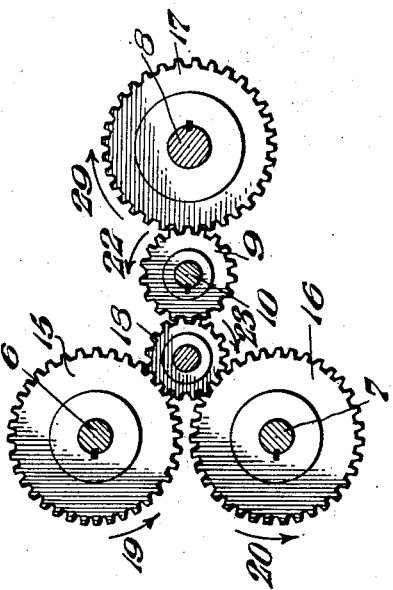
INVENTOR.
William C. Moran,
BY
ATTORNEYS.

Patented Feb. 16, 1926.

1,573,521

UNITED STATES PATENT OFFICE.

WILLIAM C. MORAN, OF LAUREL SPRINGS, NEW JERSEY, ASSIGNOR TO RIEHLE BROS. TESTING MACHINE COMPANY, OF PHILADELPHIA, PENNSYLVANIA, A CORPORATION OF PENNSYLVANIA.

TESTING MACHINE.

Application filed August 8, 1925. Serial No. 48,998.

*To all whom it may concern:*

Be it known that I, WILLIAM C. MORAN, a citizen of the United States, residing in Laurel Springs, county of Camden, and State of New Jersey, have invented a new and useful Testing Machine, of which the following is a specification.

My invention relates to a new and useful improvement in testing machines, particularly machines employed in testing the strength of materials; and it relates more particularly to tension and compression testing machines employing a plurality of screws for the application of the desired weight, force or "load." Machines of this type are generally made with a stationary platform or table, which supports one end of the specimen of the material to be tested, such platform or table being carried by one end of a suitable weighing device, such as a lever, or compound lever system, the other end of which lever or lever system terminates in a scale beam, along which can be be moved a poise, and a suitable movable head or plate carried by a plurality of parallel load screws, which head is adapted to be moved relative to said stationary table by the revolution of said load screws.

Machines of this type have been made heretofore, employing two, three, or four load screws. In each of the machines made heretofore, it has been the practice to revolve each of these load screws in the same direction. As a result of this construction, it has been the invariable experience in using these machines, that, due to the friction between the threads of the load screws and the threads of the corresponding threaded openings in the head of the machine, particularly when the head is under a considerable pressure or "load", the screws exert turning forces or moments upon the head, transversely of the direction of travel of the same, at each of the corners through which said screws pass; with the result that the force thus set up, is combined or additive, since the screws all rotate in the same direction, and form a single resultant turning moment tending to revolve the head about some central axis, intermediate of and parallel to said screws.

This turning moment exerted upon the head of the machine, by the plurality of load screws all revolving in the same direction of the machine, that is, the direction of rotation of the screws is suddenly reversed under a load, as is often the case in making tests. In such cases the head would be suddenly turned in the opposite direction a considerable amount, with an attendant harmful effect upon the test.

By my novel construction in testing machines of the character stated, employing screws for the application of the load, I overcome this difficulty by substantially eliminating or neutralizing the turning force or resultant moment on the head, due to the friction between the load screws and the head, particularly when the latter is under a load.

I accomplish the above ends by a novel construction, wherein one or more of the several load screws is made to rotate in a direction opposed to that of the other load screws on such machine, thereby counteracting the movements due to the frictional forces of the screws revolving in the opposite direction.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—

Figure 1 represents a front elevation of a three screw testing machine, embodying my invention.

Figure 2 represents a plan view in section taken on line 2—2 of Figure 1.

Figure 3 represents a diagram showing the relation of frictional forces and turning moments in the particular embodiment of my invention, shown in Figures 1 and 2.

Figure 4 represents a diagram showing the relation between the turning moments and the pitch of the screw.

Referring to the drawings, in which like reference characters indicate like parts, 1 designates the stationary platform or table of a testing machine of a conventional construction, suitably mounted upon the series of levers 2 and 3 which are in turn operatively connected to the measuring or scale beam 4 of the usual construction, which carries a suitable poise for the measurement of the "load". In the drawings I have illustrated a three screw type of testing machine, in which the movable head 5 of the machine is carried upon three parallel load screws 6, 7 and 8, disposed with respect to each other, at the apices of an isosceles triangle, whereas the specimen of the material to be tested, is located at a point intermediate of said three screws. In the particular type of machine thus illustrated, the two screws 6 and 7 at the base of the isosceles triangle are of a lesser diameter than the single screw 8 at the top of the triangle; the former being commonly designated at "back screws", while the latter is designated as the "front screw".

In machines of this type, made heretofore, it has been the practice to drive each of these three load screws in the same direction, by means of a central driving pinion engaging and in mesh with similar gears carried by the terminal portions of each of the several screws. By my novel construction I provide the driving pinion 9, carried by the vertical driving shaft 10, which in turn is again driven through the worm 11 and worm gear 12, by a horizontal drive shaft 13, which forms the inner terminal of a train of gears, contained within the gear box 14 of the machine, of the usual construction, and hence not shown in detail in the drawings. Through this train of gear the driving shaft is connected to a suitable source of power, such as an electric motor or the like.

The screws 6, 7 and 8 are provided with the similar gears 15, 16 and 17 respectively, suitably keyed thereto, the gear 17 being in direct mesh with the driving pinion 9 as shown in Figures 1 and 2; while the two "back" gears 15 and 16 are in mesh with an idle gear 18, which in turn is in mesh with the driving pinion 9; thereby imparting to said gears 15 and 16, and hence to the screws 6 and 7, a rotation opposed to the rotation of the "front" screw 8. The directions of rotation of the several gears shown in Figure 2, are indicated by the arrows 19, 20, 21, 22 and 23.

The following is a mathematical explanation of the effect of the reversal of one or several of the screws in machines of this type, with particular reference, however, to a three screw machine shown in the drawings, reference being had, particularly, to Figures 2, 3 and 4; Figure 3 being a diagram showing the turning moments on the head of the machine, due to the several forces exerted upon the head by the several screws.

For the purposes of this explanation:—
R represents the radius of pitch of back screw.
R′ represents the radius of pitch of front screw.
N represents direct tension load on a back screw.
N′ represents direct tension load on front screw.
$f$ represents coefficient of friction of front and rear screws.
D represents distance from center of a back screw to any point O in head.
D′ represents distance from center of front screw to any point O in head.

The force normal to the screw thread causes the frictional resistance, and $$=\frac{N}{\cos a}.$$

The horizontal component of $$\frac{N}{\cos a}=N\tan a.$$

Frictional resistance on pitch line of screw due to $$\frac{N}{\cos a}=\frac{N}{\cos a}f.$$

Hence turning moment about any point in head due to the frictional resistance $$=\frac{N}{\cos a}f\frac{R}{D}.$$

Considering the two back screws as rotating in the same direction, the turning moments of the two screws about the center of the specimen are additive.

Hence turning moment of head about O due to the two back screws $$=\frac{2N}{\cos a}f\frac{R}{D}.$$

It is evident that if the third or front screw were to rotate in the same direction as the two back screws, the turning moment due to its frictional resistance would also be additive with that of the two back screws. Therefore, on reversing the direction of rotation of the front screw, the frictional resistance of the front screw will cause a turning moment in the head, which will tend to neutralize the combined turning moment of the two back screws.

The turning moment due to the front screw $$=\frac{N'}{\cos a'}f\frac{R'}{D'}.$$

Hence resultant turning moment of head due to friction only=

$$\frac{2N}{\cos a}f\frac{R}{D}-\frac{N'}{\cos a'}f\frac{R'}{D'}=f\left\{\frac{2NR}{D\cos a}-\frac{N'R'}{D'\cos a'}\right\}$$

The combined turning moment of head with one screw reversed would be $$f\left\{\frac{2NR}{D\cos a} - \frac{N'R'}{D'\cos a'}\right\} + \left\{\frac{2N\tan aR}{D} - \frac{N'\tan a'R'}{D'}\right\}$$

If one screw were not reversed then the combined turning moment of the head would be $$f\left\{\frac{2NR}{D\cos a} + \frac{N'R'}{D'\cos a'}\right\} + \left\{\frac{2N\tan aR}{D} + \frac{N'\tan a'R'}{D'}\right\}$$

I do not claim that this arrangement eliminates entirely the tendency of the head to twist during a test but do claim that it reduces considerably the above mentioned tendency.

From the above explanation it is thus seen that by reversing the direction of rotation of one or more of the load screws, in testing machines of this type, whether such machines employ 2, 3 or 4 screws for the application of the load; the turning moments on the head of the machine, due to the forces exerted upon it by the several screws, are substantially neutralized, or the resultant turning moment of the several screws can be brought substantially to zero. While the neutralization of these various turning moments in the head is not exact or absolute, it is sufficient for practical purposes and substantially eliminates the tendency of the head to turn when the power is stopped or suddenly reversed under a load.

It will now be apparent that I have devised a novel and useful construction of a testing machine which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is

1. A testing machine including stationary and movable specimen supports, more than two load screws operatively engaging said movable support and adapted to move the same relatively to said stationary support with the revolution of said screws, and means simultaneously to revolve some of said screws in a direction opposed to the direction of rotation of the other of said screws.

2. A testing machine including stationary and movable specimen supports, three load screws operatively engaging said movable support and adapted to move the same relative to said stationary support with the revolution of said screws to vary the distance between said two supports and means to revolve one of said screws in a direction opposed to the direction of rotation of the other two screws and simultaneously therewith.

3. A testing machine including stationary and movable specimen supports, a plurality of load screws operatively engaging said movable support and adapted to move the same relative to the stationary support with the revolution of said screws to vary the distance between said two supports, a driving gear, an idler gear in mesh therewith, gears carried by each of said load screws, some of said gears being in mesh with said driving gear and the remaining gears being in mesh with said idler gear, thereby to revolve said load screws simultaneously and in opposite directions.

WILLIAM C. MORAN.